United States Patent
Hwang

(10) Patent No.: US 7,053,949 B2
(45) Date of Patent: May 30, 2006

(54) CHARGE COUPLE DEVICE CONTROL SYSTEM FOR SCANNER

(75) Inventor: Bar-Chung Hwang, Taoyuan (TW)

(73) Assignee: Winbond Electronics Corp., Hsinchu (TW)

( * ) Notice: Subject to any disclaimer, the term of this patent is extended or adjusted under 35 U.S.C. 154(b) by 664 days.

(21) Appl. No.: 10/091,944

(22) Filed: Mar. 5, 2002

(65) Prior Publication Data

US 2003/0123105 A1    Jul. 3, 2003

(30) Foreign Application Priority Data

Dec. 31, 2001    (TW) .............................. 90133085 A

(51) Int. Cl.
*H04N 3/14*    (2006.01)

(52) U.S. Cl. ...................................... 348/312; 358/482

(58) Field of Classification Search ................ 348/272, 348/273, 277, 280, 311, 312, 320, 322, 483, 348/296, 298; 358/482, 483
See application file for complete search history.

(56) References Cited

U.S. PATENT DOCUMENTS 4,743,963 A *  5/1988  Abuyama .................. 358/528
4,782,394 A *  11/1988  Hieda et al. ................. 348/296
4,831,453 A *  5/1989  Takemura .................... 348/296
4,989,075 A *  1/1991  Ito .............................. 348/280
5,812,187 A *  9/1998  Watanabe ..................... 348/70
5,982,428 A *  11/1999  Charneski et al. .......... 348/312
6,201,617 B1 *  3/2001  Kusaka ........................ 358/482
2003/0048371 A1 *  3/2003  Oda ............................ 348/312
2003/0189736 A1 *  10/2003  Ikeda .......................... 358/475

* cited by examiner

*Primary Examiner*—David Ometz
*Assistant Examiner*—Hung H. Lam
(74) *Attorney, Agent, or Firm*—J.C. Patents

(57) ABSTRACT

A control system and method for the CCD scanner, wherein the CCD can process multiple primary colors and includes a shift register and a transfer gate. The control system at least includes a transfer controller. The characteristic includes providing a transfer signal and multiple charge-shift clock signals, wherein any each one charge-shift clock signal corresponds to one primary color. All charge data with respect to the primary colors are transferred to the shift register through the transfer gate in once operation when the transfer signal is true. The shift register shifts out the charge data according to each of the charge-shift clock signals charge coupled device.

5 Claims, 7 Drawing Sheets

CHARGE COUPLE DEVICE CONTROL SYSTEM FOR SCANNER

CROSS-REFERENCE TO RELATED APPLICATION

This application claims the priority benefit of Taiwan application serial no. 90133085, filed Dec. 31, 2001.

BACKGROUND OF THE INVENTION

1. Field of Invention

The present invention relates to a control system for a scanner. More particularly, the present invention relates to a control system for controlling the charge coupled device (CCD) of a scanner.

2. Description of Related Art

The color charge coupled device (CCD) of most color scanners often includes special detection device for extracting the three primary colors R, G, B (red, green and blue) in pixels. As the CCD detects the brightness level of each primary color, different amount of charges will be accumulated depending on intensity of the color. After a period of exposure, the potential resulting from the accumulation of charges in each light-sensing point is transferred out to create a section of analog signal. The whole process, starting from the shining of a beam of light on the CCD to the generation of an analog signal, must go through a series of steps including light exposure, charge transfer and voltage shifting. At present, the CCD inside most color scanners has pixel detection units for the three primary colors red R, green G and blue B, and transfer gates and shift registers for each primary color. After moving the accumulated charges from the transfer gate to the shift register, an output analog voltage is generated.

Conventionally, there are several methods for detecting and acquiring information about the brightness level of a color. One method is to tap into the analog signals obtained through the conversion of primary color intensity level during each pixel clock cycle. FIG. 1A is a timing diagram showing a conventional method of acquiring the brightness intensity of all three primary colors and converting the intensities of the primary colors into analog signals. As shown in FIG. 1A, in each section of the pixel clock (between two analog signals), the accumulated charges resulting from the intensity levels of three primary colors are transferred to the shift registers via the transfer gates simultaneously. Thereafter, the analog signals that represents the intensity levels of the three primary colors RGB are converted to digital signals through an analog-to-digital converter (ADC). Although the method can provide a faster reading speed, analog-to-digital conversion of all three primary colors must be completed within each transfer period. Hence, clocking frequency of analog-to-digital conversion must be three times as fast as the frequency needed to capture the analog signals. Consequently, a structurally complicated and fast analog-to-digital converter is required to operate in this mode.

FIG. 1B is a timing diagram showing a second conventional method of acquiring the intensity of all three primary colors and converting the intensities of the primary colors into analog signals. In this mode of operation, the analog signal of only one of the three primary colors is captured in each pixel clock period. Since the CCD only provides a single transfer control signal line, the acquisition of analog signals that represents the intensity levels of the three primary colors must be displaced and positioned after the transfer clock pulse. Because only one transfer signal is allowed, a sufficiently bright light source must be provided by the scanner when signals are shifted out so that a sharp color contrast is obtained. In order to provide sufficient light intensity, a lot of electric power is wasted. However, if insufficient light is supplied, frequency of shift pulses must be reduced to increase the amount of exposure. Hence, scanning speed will drop. In other words, it is impossible to lower electricity consumption and increase operating speed without lowering the quality of scanned image in this mode.

In a third conventional method, the charge coupled device is capable of providing three transfer control signal lines. Hence, different time periods can be used for transferring the intensity of each primary color and exposure time can be extended without reducing scanning speed. FIG. 1C is a timing diagram showing the third conventional method of acquiring the intensity of all three primary colors and converting the intensities of the primary colors into analog signals. Although better scanning quality can be obtained without using too bright a light source, the method demands a continuous movement of the motor when the intensity level of a first primary color is transferred. One consequence of such movement is a vertical shift in the first primary color that may cause a mismatch with the other two primary colors. Therefore, a portion of the scanned image may be blurred. For example, in a black and white document, colored image data may emerge due to a color mismatch.

In brief, the conventional methods of controlling color scanning has several drawbacks, including:

1. If the analog signals representing all three primary colors are extracted within each pixel clock, image data can be read a lot faster. However, structurally complex and fast analog-to-digital converter must be used.

2. If the analog signal of one of the three primary colors is captured in each pixel clock period, the scanner must consume lots of electricity or else the scanning speed is slow. This is because only a single transfer control line is provided by the charge coupled device. It is impossible to lower electricity consumption and increase operating speed without lowering the quality of scanned image at the same time.

3. If the charge coupled device provides three transfer control signal lines, better scanning quality can be obtained without using too bright a light source. However, a vertical shift in color matching may occur leading a blur image.

SUMMARY OF THE INVENTION

The invention provides a control system and a control method for the charge coupled device of a scanner, in which it is not necessary to include a fast speed and complicate ADC but the scanning speed and the power saving can both remain in a quality with clear scanning image.

Accordingly, one object of the present invention is to provide a control system for the charge coupled device of a scanner, in which the charge coupled device can process multiple primary colors and at least includes a shift register and a transfer gate. The control system includes a transfer controller and a charge-shift enable generator and a combined logic circuit. The transfer controller is coupled to the charge coupling device and emitting a transfer signal and a charge-shift control signal. The charge coupled device is controlled by the transfer signal, and all charge data with respect to the primary colors are transferred to the shift register through the transfer gate in once operation when the transfer signal is true. The charge-shift enable generator is coupled to the transfer controller and sequentially issues multiple charge-shift enable signals with respect to the primary colors, according to the transfer signal. The combined logic circuit is coupled to the transfer controller, the charge-shift enable generator, and the charge coupling device. According to the charge-shift enable signal and the charge-shift control signal, multiple charge-shift clock signals with respect to each of the primary colors after the computation by the combined logic circuit. One charge-shift clock signal corresponds to one of the primary colors, and the shift register, according to each the charge-shift clock signal, shifts out the corresponding charge data.

This invention also provides a method of controlling the charge coupled device of a scanner, wherein the charge coupled device can process multiple primary colors. The method the following steps. The charge data with respect to the primary colors are transferred in once operation when the transfer signal is true. Multiple charge-shift clock signals are generated, wherein each one of the charge-shift clock signals corresponds to one of the primary colors. Finally, the charge data with respect to each primary color is sequentially shifted out, according to the charge-shift clock signals.

In summary, the invention uses a transfer signal and sequentially acquires the charge data for each primary color (including control using several charge-shift clock signals or control using the one charge-shift control signal and several enable signal to shift out the charge data in multiple periods). In this manner, the drawbacks in the conventional scanning technology can be avoided. In addition, since the charge data of each primary color are not simultaneously shifted out, all of the primary colors do not interfere each other. The electromagnetic interference during exporting the charge data is also reduced.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

DESCRIPTION OF THE PREFERRED EMBODIMENTS

Figure 1A:
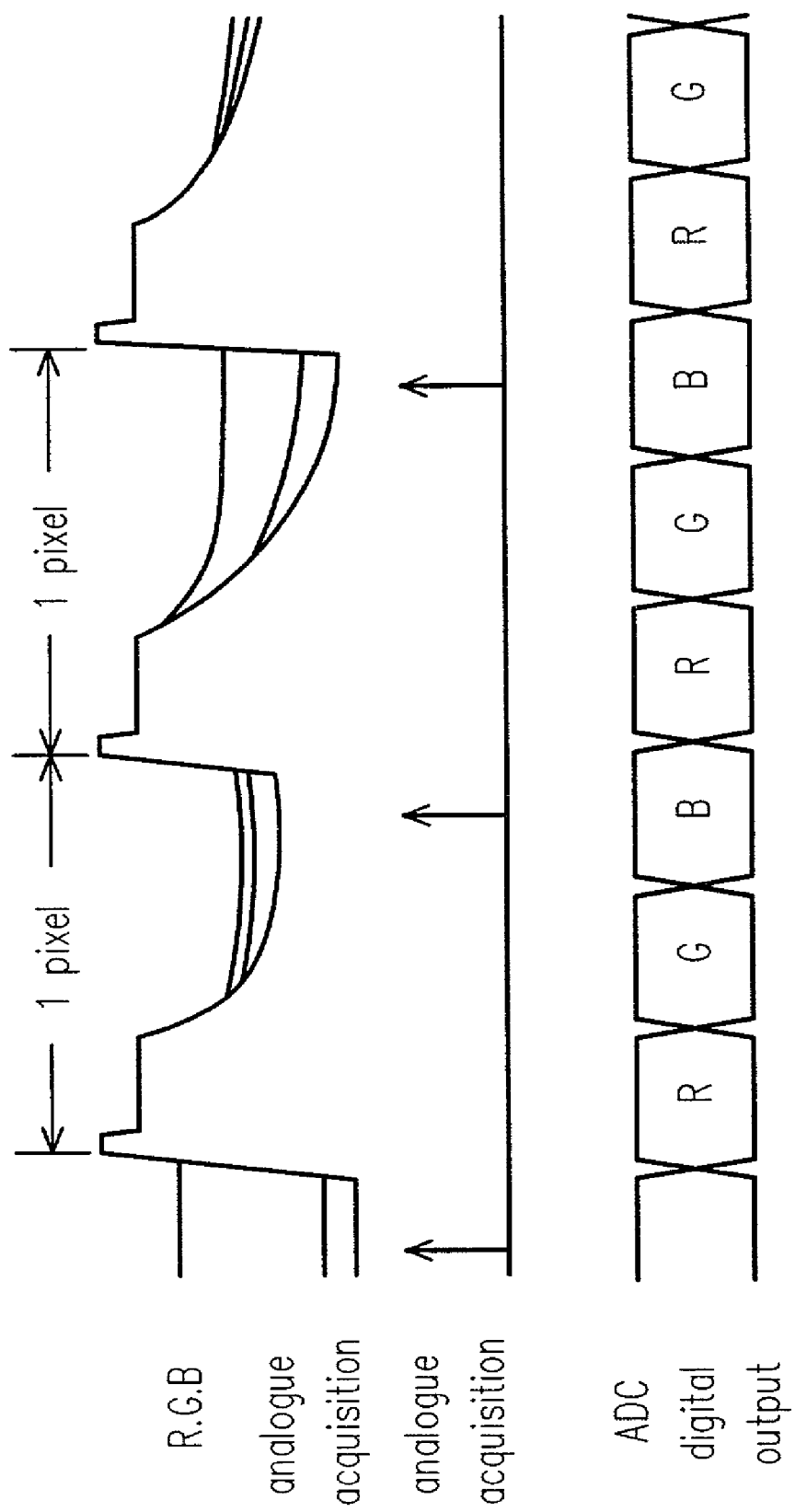
FIG. 1A is a timing diagram showing a conventional method of acquiring the intensity of all three primary colors RGB and converting the intensities of the primary colors into analog signals.
Figure 1B:
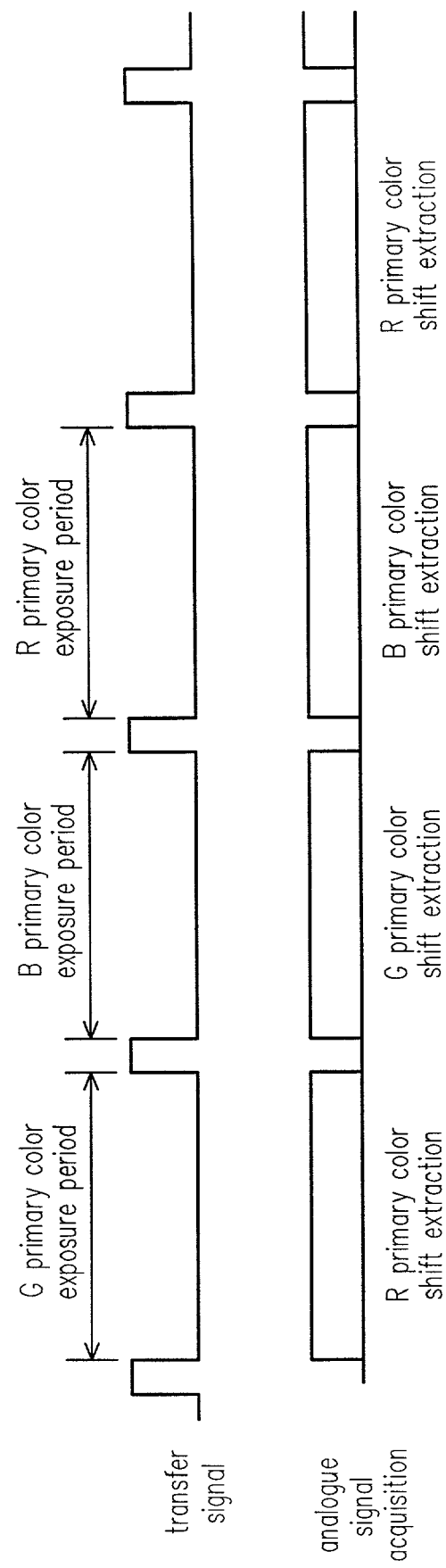
FIG. 1B is a timing diagram showing a second conventional method of acquiring the intensity of all three primary colors RGB and converting the intensities of the primary colors into analog signals.
Figure 1C:
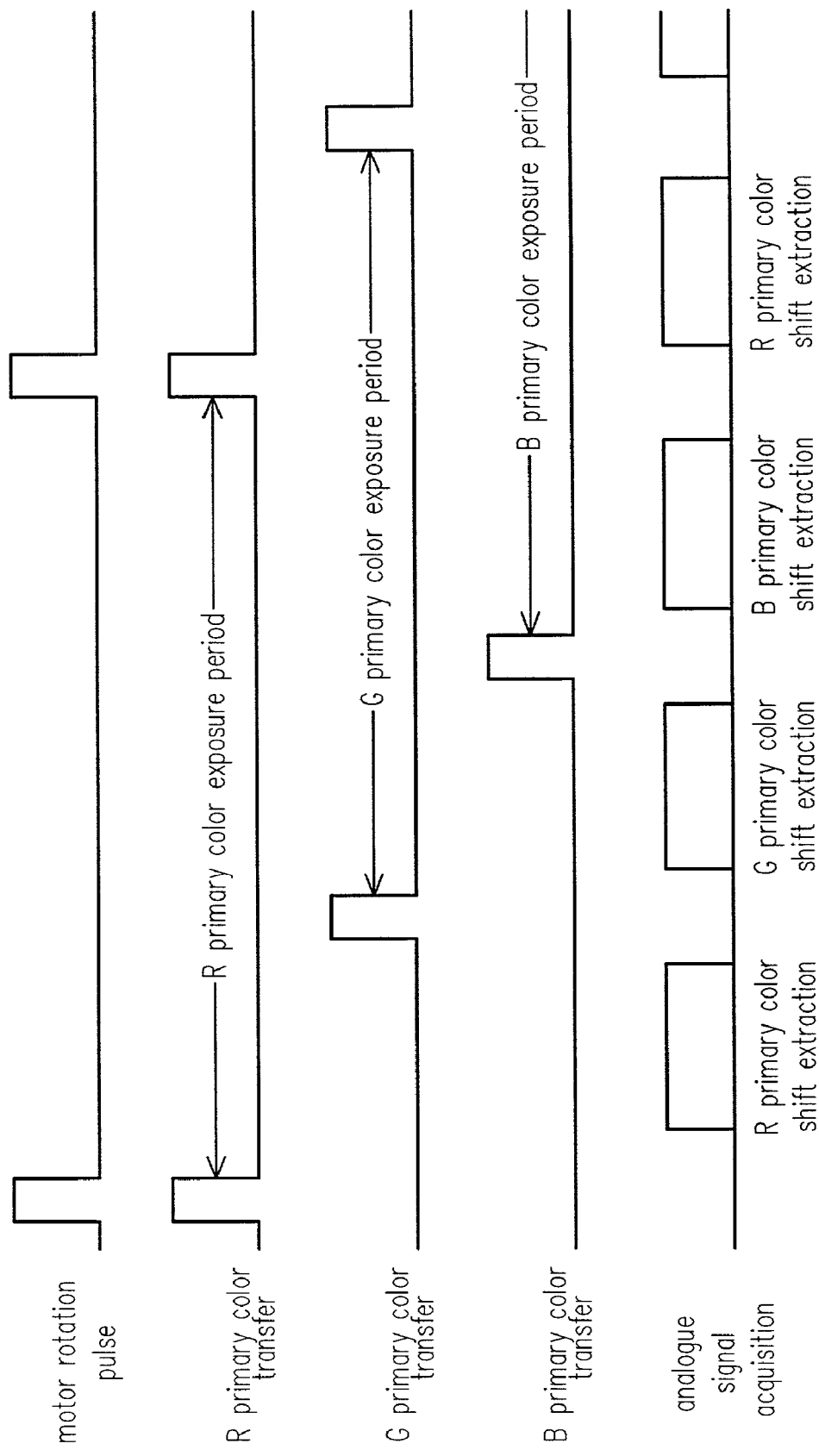
FIG. 1C is a timing diagram showing the third conventional method of acquiring the intensity of all three primary colors RGB and converting the intensities of the primary colors into analog signals.

Reference will now be made in detail to the present preferred embodiments of the invention, examples of which are illustrated in the accompanying drawings. Wherever possible, the same reference numbers are used in the drawings and the description to refer to the same or like parts.

For convenient descriptions, a color scanner and it operation method are briefly described. Most color scanners use a color charge coupled device (CCD) and most color CCDs use red (R), green (G) and blue (B) as the three primary colors for sensing or composition. In all these color scanners, the three primary colors RGB are divided into three separate lines on the color CCD. A fluorescent tube that emits white light is often used as a light source. As light from the light source shines on a document, some of the incoming light is reflected back. After a multiple of reflection through mirrors, the reflected light enters a lens system. Finally, the reflected light is focused on the color CCD. Each of the RGB lines on the CCD are capable of sensing the intensity level of a primary color returned from the document. In the subsequent stage, these intensity levels are converted into analog voltages. The whole process starting from the entrance of light into the color CCD to the output of an analog signal involves light exposure, charge transfer and output shifting of data.

Figure 2:
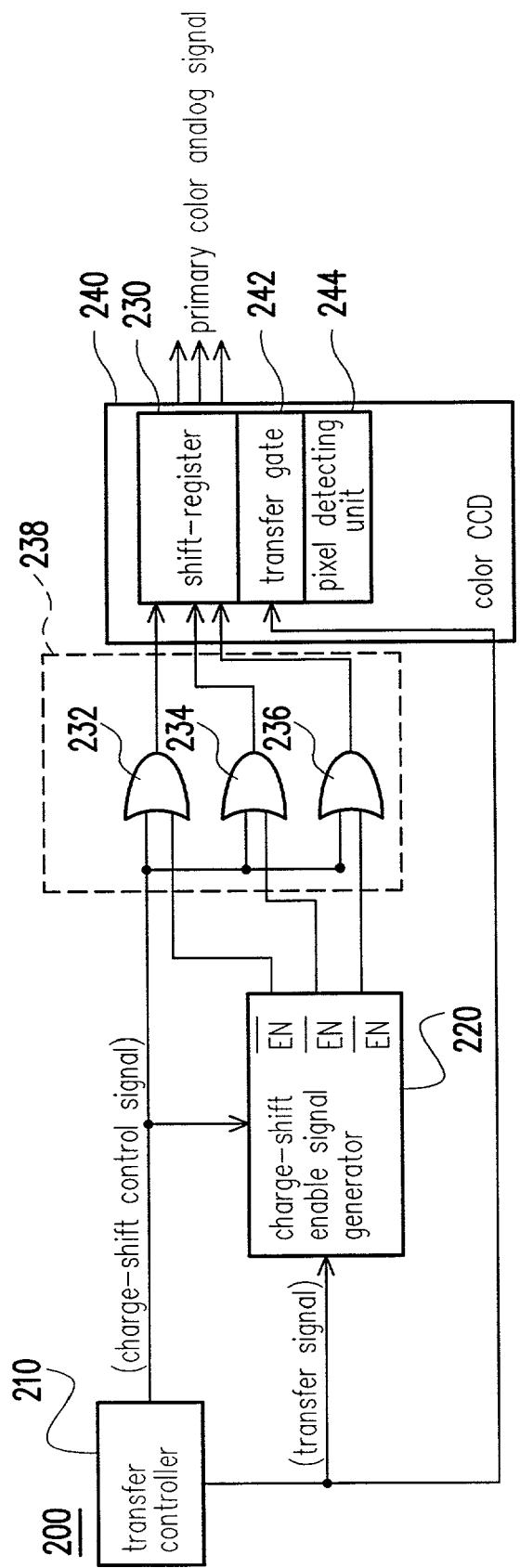
FIG. 2 is a block diagram showing a control system according to a first embodiment of this invention.

FIG. 2 is a block diagram showing a control system according to a first embodiment of this invention. In this embodiment, a charge coupled device control system 200 is shown. The CCD control system 200 includes a transfer controller 210, a charge-shift enable signal generator 220, and a plurality of OR gates 232, 234 and 236 to form a combined logic circuit 238. The color CCD 240 in the control system is a control target, including a shift register 230, a transfer gate 242, and a pixel detecting unit 244. It should be noted that even though the combined logic circuit, which is composed of the transfer controller 210, the charge-shift enable signal generator 220, and the OR gates 233, 234 and 236, is located at outside of the color CCD 240, it is only a design choice. In other words, the device blocks can be partially are all composed in the CCD device 240.

In this embodiment, the transfer controller 210 can produce a transfer signal and a charge-shift control signal. After the transfer signal becomes true within a transfer period, the charge data corresponding to each primary color, such as RGB, within the color CCD 240 are transferred to the shift register 230 through the transfer gate 242 in once operation. The charge-shift enable signal generator 220 sequentially generates a plurality of enable signals $\overline{EN}$ according to the transfer signal and the charge-shift control signal emitted by the transfer controller 210. Each enable signal $\overline{EN}$ corresponds to a primary color. In other words, each of the three enable signals $\overline{EN}$ is output to an input terminal of the OR gates 232, 234 and 236 respectively. Each of these OR gates 232, 234 and 236 is responsible for controlling the output of charge data of one primary color from the shift register 230.

The shift register 230 uses a result signal, which is called as charge-shift clock signal and is resulted from the charge-shift control signals and the enable signal $\overline{EN}$ after going through the intermediate OR gates 232, 234 and 236, to control the output of the shift register. For example, when the enable signal $\overline{EN}$ entering the OR gate 232 is true, i.e, in low voltage level, the charge-shift control signal can pass the OR gate 232, therefore the correct charge-shift clock signals are exported. Under such circumstances, charge data of the primary color controlled by the OR gate 232, for example, the charge data of the primary color, such as red R, are exported from the shift register 230. It should be noted that in order to achieve sequential output of the various primary color charge data in batches, the truth values produced by the three enable signals $\overline{EN}$ must follow the desired sequence for outputting the charge data of the primary colors.

Figure 3:
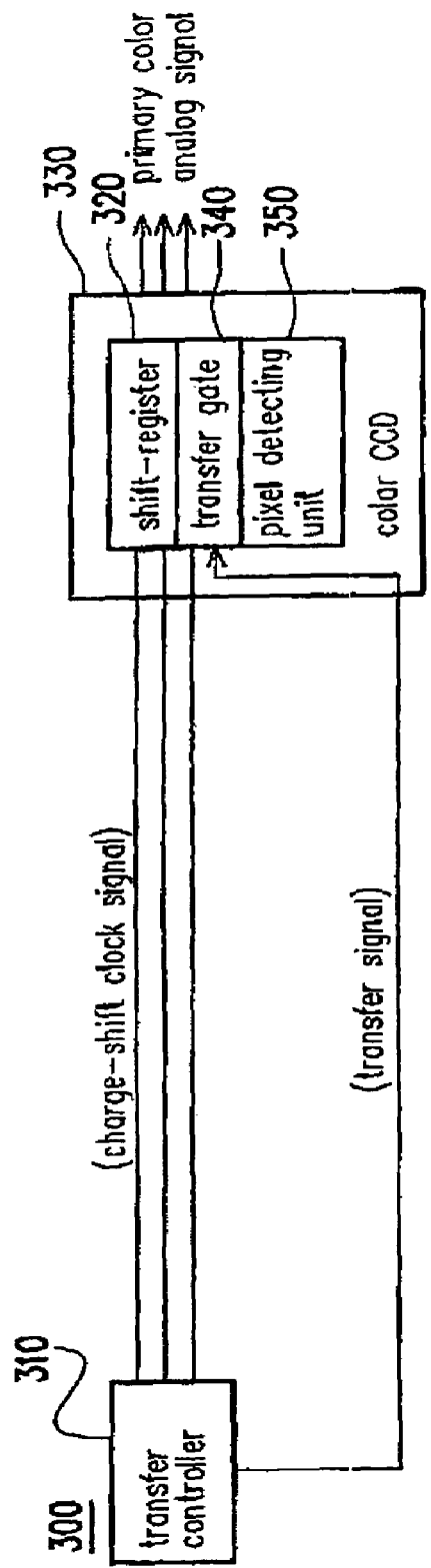
FIG. 3 is a block diagram showing a control system according to a second embodiment of this invention.

FIG. 3 is a block diagram showing a control system according to a second embodiment of this invention. In the second embodiment, the scanner control system is 300 includes a transfer controller 310 and a color CCD 330. The CCD 330 includes a shift register 320, a transfer gate 340, and a pixel detecting unit 350.

In the embodiment, the transfer controller 310 can emit a transfer signal and a plurality of charge-shift clock signals. Each charge-shift clock signal corresponds to one primary color. In addition, after the transfer signal becomes true within a transfer period, the charge data corresponding to each primary color within the color CCD 330 are transferred to the shift register 320 through the transfer gate 340 in once operation. The shift register 320 is triggered by one of the charge-shift clock signals and shifts out the charge data of the primary color with respect to the charge-shift clock signals, such as the charge data for the red R color. Then, the shift register 320 is triggered by another one of the charge-shift clock signals and shifts out the charge data of the corresponding primary color, such as green G color. Likewise, the shift register 320 sequentially shifts the charge data with respect to the third charge-shift clock signal for the blue B color.

Figure 4:
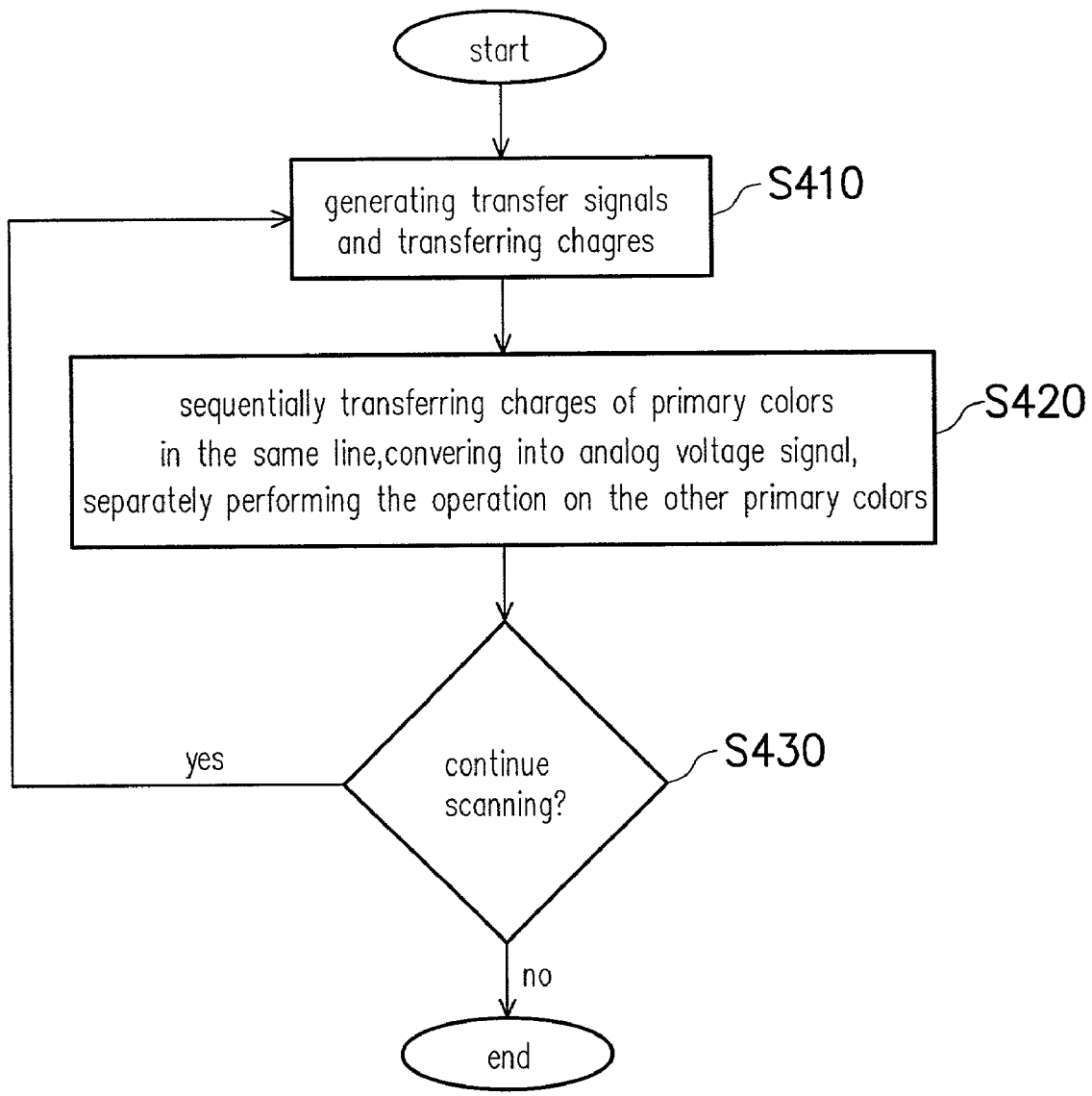
FIG. 4 is a flow chart showing the steps in implementing the control system of this invention.

FIG. 4 is a flow chart showing the steps in implementing the control system of this invention. This method of controlling a color scanner is suitable for use in all scanners that employ a plurality of primary colors. The CCD device includes a shift register, a transfer gate, and a pixel detecting unit. In step S410, a transfer signal is generated. When the transfer signal is true and is within a small transferring period, the charge data representing a particular primary color is transferred to the shift register in once operation. Then, in step 420, the shift register shifts out the charge data with respect to the primary colors in the same line, such as shifting out all red R charge data in the same line. The CCD also converts them into analog voltage signals. And then, the shift register sequentially shifts out another charge data with respect to the primary colors in the same line, such as shifting out all green G charge data in the same line. Likewise, all the other charge data are sequentially shifted out, such as shifting the blue B charge data in the same line. In step S430, a judgement is made about whether or not the scanning process on the next line is to continue. If it is, the procedure jumps to execute the step S410. Otherwise, the procedure stops.

In the invention, a charge-shift control signal is also provided. When the transfer signal is true, several charge-shift enable signals with respect to the primary colors are generated. After the logic operation for the charge-shift enable signals and the charge-shift control signal, such as the OR operation, then several charge-shift clock signals are sequentially generated. Each one of the charge-shift clock signals corresponds to one primary color. Therefore, the shift register, according to each of the charge-shift clock signals, shifts the charge data with respect to the primary color.

Figure 5:
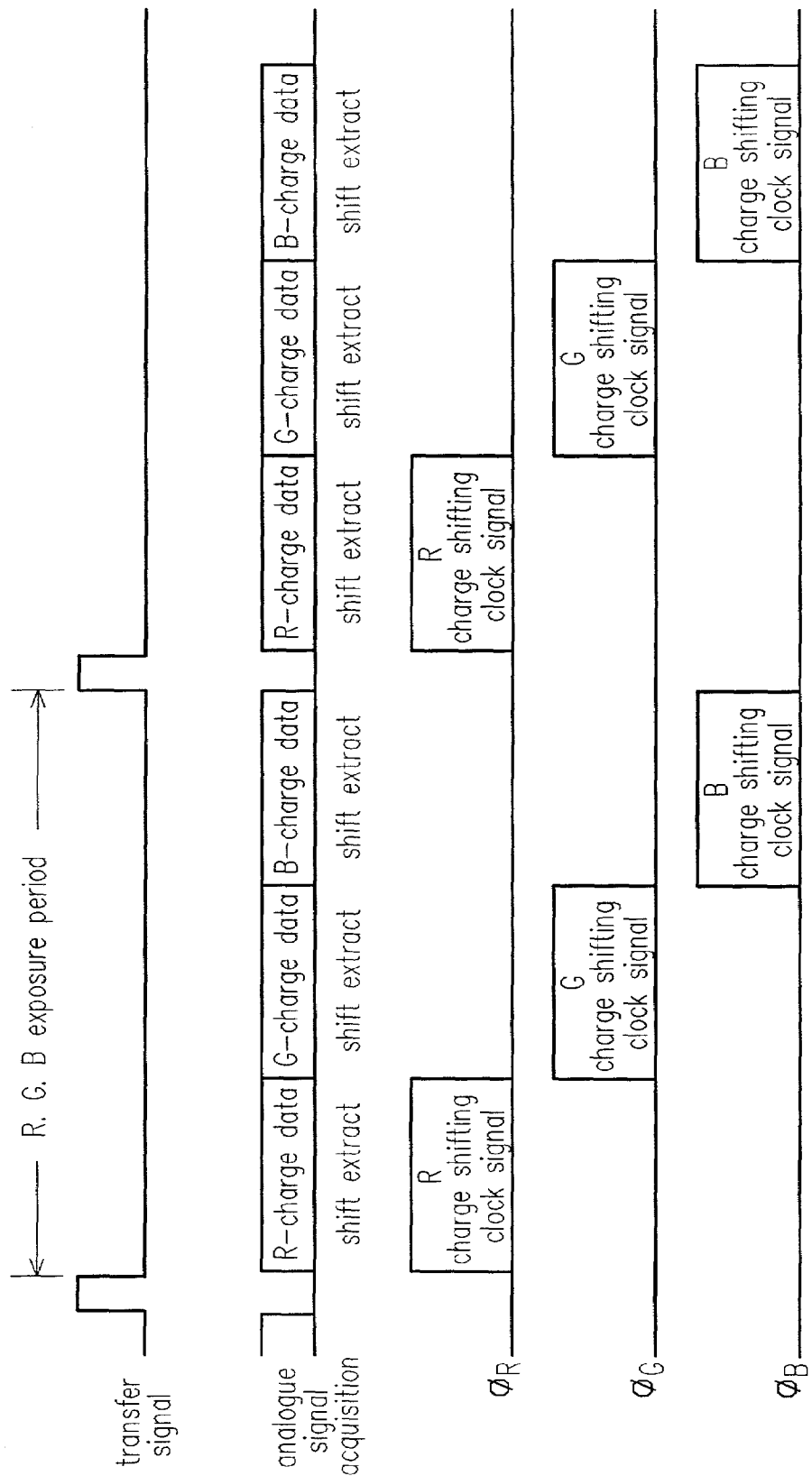
FIG. 5 is a timing diagram showing the operating sequence of one preferred embodiment of this invention.

FIG. 5 is a timing diagram showing the operating sequence of one preferred embodiment of this invention. As shown in FIG. 5, when the transfer signal is true, the charge data of the primary color are transferred to the shift register in once operation. After then, there is a period of exposure time for the RGB primary color. This exposure time period is also the shifting period for the foregoing charge data of the primary color. In this period, the charge data representing the RGB three primary colors are sequentially shifted out, and the charge data are respectively shifted and acquired in R, G, B three routes.

In summary, the charge coupled device control system of this invention is able to produce high-quality scan image without consuming lots of power or slowing down the scanning operation. In addition, since the charge data of various primary colors appear at different times, interference between the primary colors is avoided and electromagnetic interference between charge data is greatly reduced.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A control system for the charge coupled device of a scanner, the charge coupled device having ability to process a plurality of primary colors, the charge coupled device at least including a shift register and a transfer gate, the control system comprising:

a transfer controller, coupled to the charge coupled device, used to provide a transfer signal and a charge-shift control signal, wherein the charge coupled device is controlled by the transfer signal, and all charge data with respect to the primary colors are transferred to the shift register through the transfer gate in one operation when the transfer signal is true;

a charge-shift enable generator, coupled to the transfer controller and sequentially issuing a plurality of charge-shift enable signals with respect to the primary colors, according to the transfer signal; and a combined logic circuit, coupled to the transfer controller, the charge-shift enable generator, and the charge coupling device, wherein according to the charge-shift enable signals and the charge-shift control signal, issuing a plurality of charge-shift clock signals with respect to the primary colors after computation by the combined logic circuit, wherein each one of the charge-shift clock signals corresponds to one of the primary colors, and the shift register shifts out the corresponding charge data according to each of the charge-shift clock signals.

2. The control system of claim 1, wherein the combined logic circuit includes a plurality of OR gates, and each of the OR gates receives one of the charge-shift enable signals and the charge-shift control signal, and issues one of the charge-shift clock signals, whereby the shift register sequentially shifts out the charge data of the primary colors with respect to the charge-shift clock signals.

3. The color scanner system of claim 1, wherein the primary colors include red, green, and blue.

4. A control system for a charge coupled device of a scanner, the charge coupled device having ability to process a plurality of primary colors, the charge coupled device at least including a shift register and a transfer gate, the control system comprises:

a transfer controller, coupled to the charge coupled device, used to provice a transfer signal and a plurality of charge-shift control signals, each of which corresponds to one of the primary colors, wherein the charge coupled device is controlled by the transfer signal, and all charge data with respect to the primary colors are transferred to the shift register through the transfer gate in one operation when the transfer signal is true; wherein the plurality of charge-shift control signals are coupled to the shift register so that the shift register shifts out the charge data of one of the primary colors when triggered by its corresponding charge-shift control signal.

5. The improved control system of claim 4, wherein the primary colors include red R, Green G, and Blue B.

* * * * *